J. H. ARSENAULT.
GREASE CUP.
APPLICATION FILED MAY 29, 1916.

1,222,256.

Patented Apr. 10, 1917.

WITNESSES

INVENTOR
J. ARSENAULT
BY Fetherstonhaugh & Co.
ATTYS.

UNITED STATES PATENT OFFICE.

JOHN H. ARSENAULT, OF SHEDIAC, NEW BRUNSWICK, CANADA.

GREASE-CUP.

1,222,256.   Specification of Letters Patent.   Patented Apr. 10, 1917.

Application filed May 29, 1916. Serial No. 100,708.

*To all whom it may concern:*

Be it known that I, JOHN H. ARSENAULT, a subject of the King of Great Britain, and resident of Shediac, in the Province of New Brunswick, Dominion of Canada, have invented certain new and useful Improvements in Grease-Cups, of which the following is the specification.

This invention relates to improvements in grease cups. The plugs of lubricators at present used in railway and like practice, and especially those mounted on connecting rods and other movable parts, are extremely liable to work loose and become lost owing to the jarring caused by the running of the engine so that it is frequently found necessary to renew the said plugs, and one of the objects of the present invention is to facilitate locking the plug in position so that it cannot be removed without the application of an externally applied manual force. Further objects are to permit of the locking device used on the grease cups being readily mounted on grease cups at present in use, to simplify the construction and other objects to be made clear hereafter, and it consists essentially of the improved construction particularly described and set forth in the following specification and accompanying drawings forming part of the same.

In the drawings.

Like characters of reference refer to like parts in the several figures.

Figure 1:
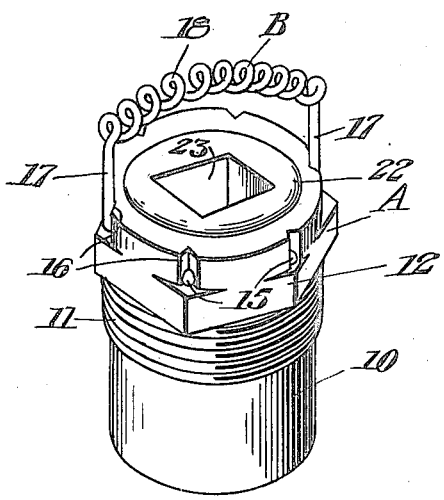
Figure 1 is a perspective view of a grease cup embodying the present invention.
Figure 2:
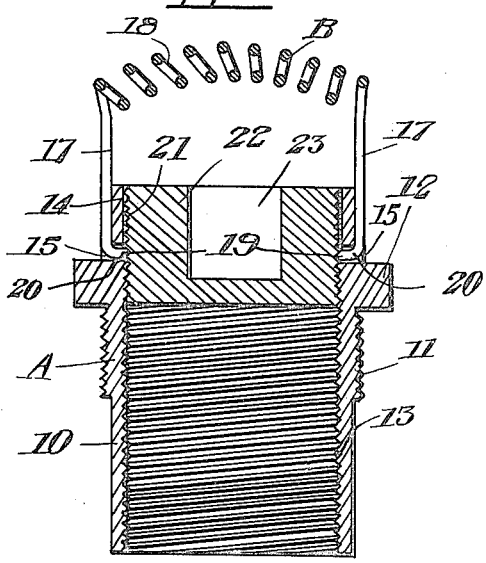
Fig. 2 is a vertical section of the same.

Referring to the drawing, A represents a grease cup consisting of the substantially cylindrical body portion 10 provided intermediate of its ends with an enlarged threaded portion 11 above which is formed the nut 12 thereby facilitating screwing the grease cup into a connecting rod or other part of an engine.

The inner surface of the body 10 is threaded as shown at 13 and the upper portion 14 is slightly enlarged and provided with a plurality of orifices 15 extending radially therethrough and arranged in pairs diametrically opposite each other. These orifices 15 extend into the recesses 16 formed in the outer periphery of the body 10 near the top thereof, which recesses are adapted to embrace the vertical arms 17 of the resilient locking member B pivotally mounted on the said body.

This locking member is preferably made of spring steel or like material and is substantially U-shaped having its parallel arms 17 connected by a curvilinearly arranged spiral spring 18, while the free ends 19 of the said arms are offset inwardly and adapted to rotatably engage with the orifices 15, the points of the offset portions being provided with substantially beveled or tapered points 20 adapted to engage with the threads 21 of the plug 22 which makes threaded engagement with the inner surface of the body 10.

The plug 22 is further provided with a squared recess 23 therein so facilitating in tightening the cover or removing the same.

The assembly of the lubricator will be readily understood from the foregoing description.

When the lubricator is in use the plug 22 is removed permitting of the grease, oil or other lubricant being placed in the body portion 10, whereupon the cover is replaced. It will be understood that during this operation the resilient locking member B is rotated into a substantially horizontal position and lies flush with the upper end of the grease cup, and when the plug 22 has been tightened to the desired extent the locking device B is rotated into a vertical position when the arms 17 spring into engagement with the recesses 16 so forcing the points 20 of the said arms into engagement with the threads 21 of the said plug and lock the same in position.

There is of course a great liability of the plug becoming worn at the points where the beveled points 19 engage with the threads thereof, but since the body 10 is provided with a plurality of orifices 15 arranged in pairs diametrically opposite each other the locking device B may be removed and engaged with any of the other pairs of orifices when such is found necessary or desirable.

From this description it will be seen that I have invented a grease cup which can be advantageously applied to railway or like practice and wherein the liability of the plug working loose is entirely obviated, the locking device being capable of being mounted on grease cups at present in use and being easily accessible and conveniently removed when required.

As many changes could be made in the above construction and many apparently widely different embodiments of my invention, within the scope of the claims, constructed without departing from the spirit or scope thereof, it is intended that all matter contained in the accompanying specification and drawing shall be interpreted as illustrative and not in a limiting sense.

What I claim as my invention is:

1. A grease cup of the class described two or more orifices therethrough, a plug making threaded engagement with the grease cup, and a U-shaped locking member pivotally mounted on the grease cup and adapted to be sprung into engagement with the plug.

2. A grease cup of the class described having two or more radially extending orifices therethrough, a plug making threaded engagement with the grease cup and a U-shaped locking member having the free ends of its parallel arms offset and rotatably engaging the orifices and adapted to be sprung into engagement with the plug.

3. A grease cup of the class described having two or more recesses in its periphery and two or more radially extending orifices extending into the said recesses, a plug making threaded engagement with the grease cup, and a U-shaped locking member having the free ends of its parallel arms offset and rotatably engaging with the orifices and adapted to be sprung into engagement with the plug.

4. A grease cup of the class described having one or more recesses in its periphery and two or more radially extending orifices extending into the said recesses, a plug making threaded engagement with the grease cup, a U-shaped locking member having its parallel arms connected by a spiral spring, the free ends of the parallel arms being offset to rotatably engage with the orifices and being provided with tapered points adapted to be sprung into engagement with the plug.

In witness whereof I have hereunto set my hand in the presence of two witnesses.

JOHN H. ARSENAULT.

Witnesses:
MINNIE POIRIER,
LILLIA ARSENEAULT.

Copies of this patent may be obtained for five cents each, by addressing the "Commissioner of Patents, Washington, D. C."